United States Patent [19]

Arszman et al.

[11] Patent Number: 5,394,690
[45] Date of Patent: Mar. 7, 1995

[54] CONSTANT PRESSURE, VARIABLE THRUST BIPROPELLANT ENGINE

[75] Inventors: Jerrold H. Arszman; William M. Chew; Barry D. Allan, all of Huntsville, Ala.

[73] Assignee: The United States of America as represented by the Secretary of the Army, Washington, D.C.

[21] Appl. No.: 123,946

[22] Filed: Sep. 20, 1993

[51] Int. Cl.⁶ .......................... F02K 3/00; F02K 9/00
[52] U.S. Cl. ........................................ 60/233; 60/237; 60/242; 60/252; 60/271
[58] Field of Search ................. 60/233, 237, 238, 242, 60/252, 271

[56] References Cited

U.S. PATENT DOCUMENTS

| | | | |
|---|---|---|---|
| 2,489,953 | 11/1949 | Burney | 60/242 |
| 2,552,497 | 5/1951 | Roach et al. | 60/242 |
| 2,566,961 | 9/1951 | Poole | 60/242 |
| 2,623,352 | 12/1952 | Sedille et al. | 60/242 |
| 3,059,425 | 10/1962 | McSherry et al. | 60/242 |
| 3,349,563 | 10/1967 | Taylor et al. | 60/252 |
| 3,871,173 | 3/1975 | McKenna | 60/271 |
| 3,948,042 | 4/1976 | Beardsley et al. | 60/242 |
| 4,039,360 | 8/1977 | Allan | 149/36 |
| 4,244,294 | 1/1981 | Frignac et al. | 60/242 |
| 4,777,795 | 10/1988 | Le Corre et al. | 60/242 |
| 5,038,559 | 8/1991 | Blackmore | 60/242 |
| 5,133,183 | 7/1992 | Asaoka et al. | 60/204 |
| 5,152,136 | 10/1992 | Chew et al. | 60/251 |

*Primary Examiner*—Richard A. Bertsch
*Assistant Examiner*—Howard R. Richman
*Attorney, Agent, or Firm*—Anthony T. Lane; Hugh P. Nicholson; Fred M. Bush

[57] ABSTRACT

A pressure controlled pintle is employed in combination with a throttling liquid, gel, or hybrid engine to provide a constant pressure and variable thrust from a single operating engine. As the propellants are throttled back and the chamber pressure drops, the pintle moves and closes the gap between the pintle and nozzle throat, thereby lowering the throat area and re-establishing the design chamber pressure related to pintle spring tension. By retaining the design pressure over a wide thrust range, the engine efficiency remains at the design value. This eliminates the drop of Isp due to pressure and keeps the cost of the system reasonable because only one engine is required. When a higher thrust is desired, a throttling valve in an injector increases the propellant flow rate, which causes a higher pressure in the combustion chamber. The constant pressure actuator moves the pintle to open the nozzle throat, which reduces the pressure to the design value. The design value may not be optimum. There are many size/temperature/volume trade off's relating to the missile as a whole which could move the design value from optimum. Because the pressure in the combustion chamber remains the same, the Isp is not greatly changed, but the thrust level increases because of the increase in the mass flow through nozzle. The combination provides substantially constant combustion chamber pressure for a single variable thrust bipropellant engine.

4 Claims, 4 Drawing Sheets

CONSTANT PRESSURE, VARIABLE THRUST BIPROPELLANT ENGINE

DEDICATORY CLAUSE

The invention described herein may be manufactured, used, and licensed by or for the Government for governmental purposes without the payment to us of any royalties thereon.

BACKGROUND OF THE INVENTION

The desire for on-demand, variable thrust engines is increasing because several evolving tactical missile systems require multi-role, multi-mission, and multi-platform capability and high maneuverability during the end game to kill evading targets. Conventional solid propulsion systems cannot provide on-demand, variable thrust. Pintle-controlled solid and throttling liquid and gel engines provide on-demand variable thrust, but at the cost of propellant usage efficiency. Controlling thrust by turning on and off liquid and gel engines (pulse modulation) also provides variable thrust at a cost to propellant usage efficiency, but at a somewhat lower degree than throttling engines. Multiple liquid or gel engines, which can be turned on and off in various combinations, provide incrementally variable thrust, but at higher cost.

Conventional solid propulsion systems can only change thrust by a change in grain formulation and/or design or by multiple grains that can be fired sequentially. This, however, limits thrust flexibility, increases complexity, cost, and the motor can only produce the pre-defined thrust schedule once a grain has been ignited. One method to minimize the thrust limitation is to use a pintle to increase or decrease the throat area. A variation of this is a variable flow valve that increases or decreases the area through which the motor effluents can pass. Both of these methods can produce continuously variable thrust levels, however, they have a lower propellant usage efficiency when they are operating at reduced thrust. To decrease thrust, these methods open the throat area, which lowers the pressure, which, in turn, decreases the burning rate and, hence, the mass flow rate. The specific impulse (Isp, thrust divided by mass flow rate) decreases as the pressure is reduced.

Liquid and gel engines are also designed with fixed nozzle throats that operate at an optimum pressure. A throttling engine operates by controlling the flow of propellants through a throttling valve. When the flow rate of propellants decreases, the combustion pressure decreases, which decreases both thrust and Isp. When a liquid or gel engine varies thrust by pulse modulation, it operates the engine at the designed pressure the percent of time required to obtain the desired thrust level. There is a finite rise and fall time for each pulse which results in small regions/areas of lower Isp. The overall Isp loss increases as the system requirements demand shorter, more frequent pulses.

A multiple engine liquid or gel propulsion design greatly reduces the loss of Isp during reduced thrust operation by operating only those engines required to reach the design thrust. This design is particularly attractive when the boost and nominal sustain thrusts are significantly different. Some losses in Isp occur during engine start-up and shut-down, but since the engines are not pulsing, these losses are minimal. Problems associated with a multiple engine design are increased manufacturing cost and minimizing system volume.

The above described approaches for achieving on-demand, variable thrust performances are recognized as having at least one common end relationship where providing variable thrust results in a cost to propellant usage efficiency. With the use of multiple liquid or gel engines, which can be turned on and off in various combinations to provide incrementally variable thrust, additional costs in addition to lower propellant usage efficiency are encountered as a result of multiple combinations which are higher in total cost. Solid propellant systems result in lower propellant usage efficiency when the systems are operated at reduced thrust. Changing thrust by a change in grain formulation and/or design or by using multiple grains that can be fired sequentially means that the solid rocket motor can only produce a pre-defined thrust schedule once a grain has been ignited. One approach to overcoming this limitation is to employ a pintle to increase or decrease the throat area. A variation of the pintle system is to employ a variable flow valve that increases or decreases the area through which the motor effluents can pass. Although these described combinations and methods of operation can produce continuously variable thrust levels, they result in low propellant usage efficiency when they are operating at reduced thrust.

Advantageous would be a system which combines a pressure controlled pintle with a throttling liquid, gel, or hybrid engine.

A primary object of this invention is to provide a pressure controlled pintle in combination with a throttling liquid, gel, or hybrid engine.

Another object of this invention is to provide a working relationship between a pressure controlled pintle and a throttling liquid, gel, or hybrid engine to retain a design pressure over a wide thrust range thereby maintaining the engine efficiency at an optimum value.

A further object of this invention is to eliminate the drop of specific impulse (Isp) due to pressure drops generally encountered in prior art combinations since the design pressure is retained by the cooperative relationships between the pressure controlled pintle and the throttling fuel system.

Still a further object of this invention is to keep the cost of the system of this invention reasonable due to requirement of minimizing the number of engines per system.

SUMMARY OF THE INVENTION

A pressure controlled pintle in combination with a throttling liquid, gel, or hybrid engine results in retaining design pressure over a wide thrust range thereby maintaining the engine efficiency at an optimum value. In operation, as the propellants are throttled back and the chamber pressure drops, the pintle closes a gap between the pintle and nozzle throat, thereby reducing or lowering the throat area and re-establishing the design chamber pressure. The pintle position is controlled by a constant pressure actuator which can be effected by spring, electromechanical, hydraulic, or pneumatic means. By eliminating the drop of specific impulse (Isp) due to retaining pressure, the system cost is at a reasonable level since only a single engine is required for a system whose efficiency remains high over a wide thrust range. Thus, the design of the constant pressure, variable thrust bipropellant engine allows continuously variable thrust with minimal propellant efficiency losses and for a reasonable cost and complexity.

DESCRIPTION OF THE PREFERRED EMBODIMENT(S)

Figure 1:
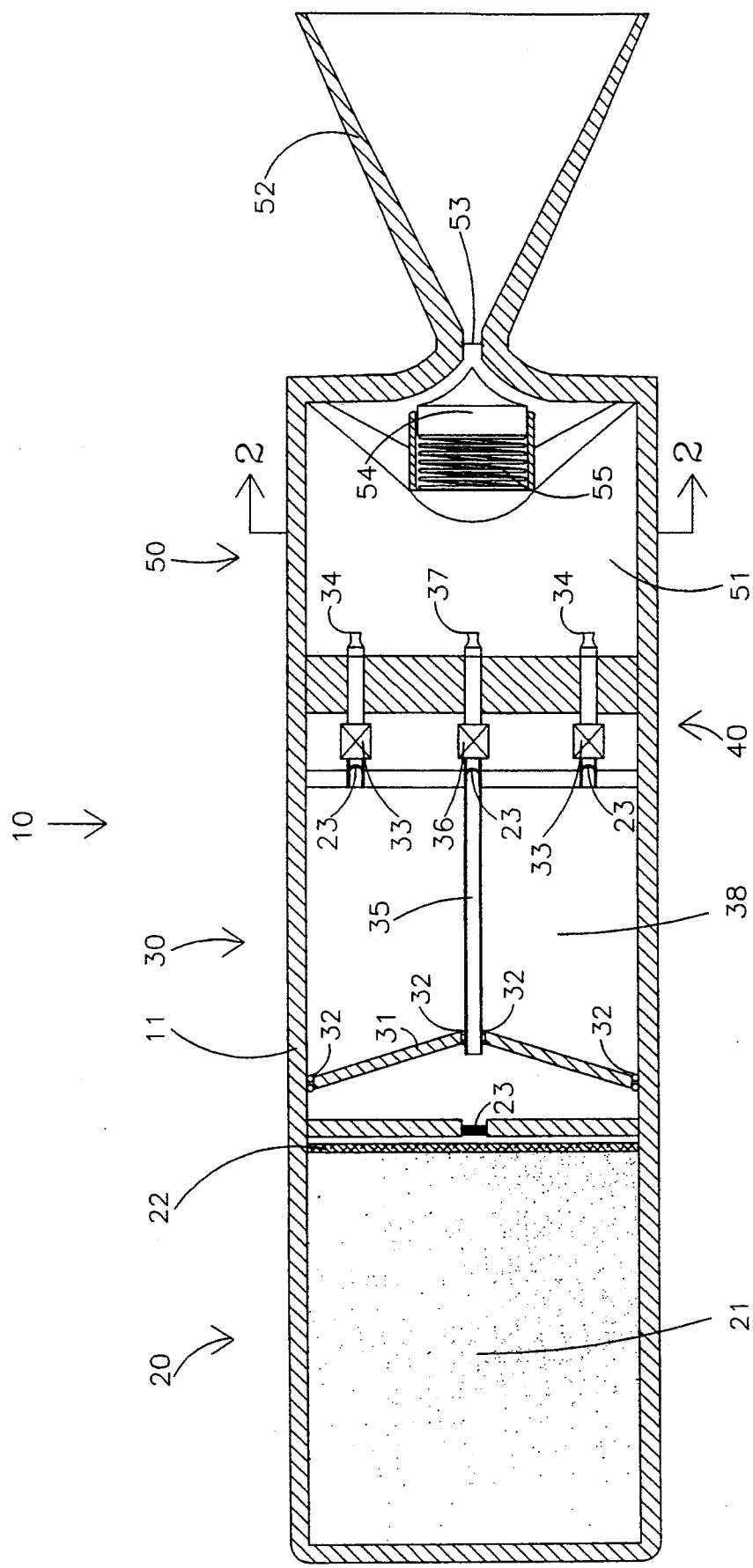
FIG. 1 depicts a pintle-controlled hybrid propellant engine.
Figure 3:
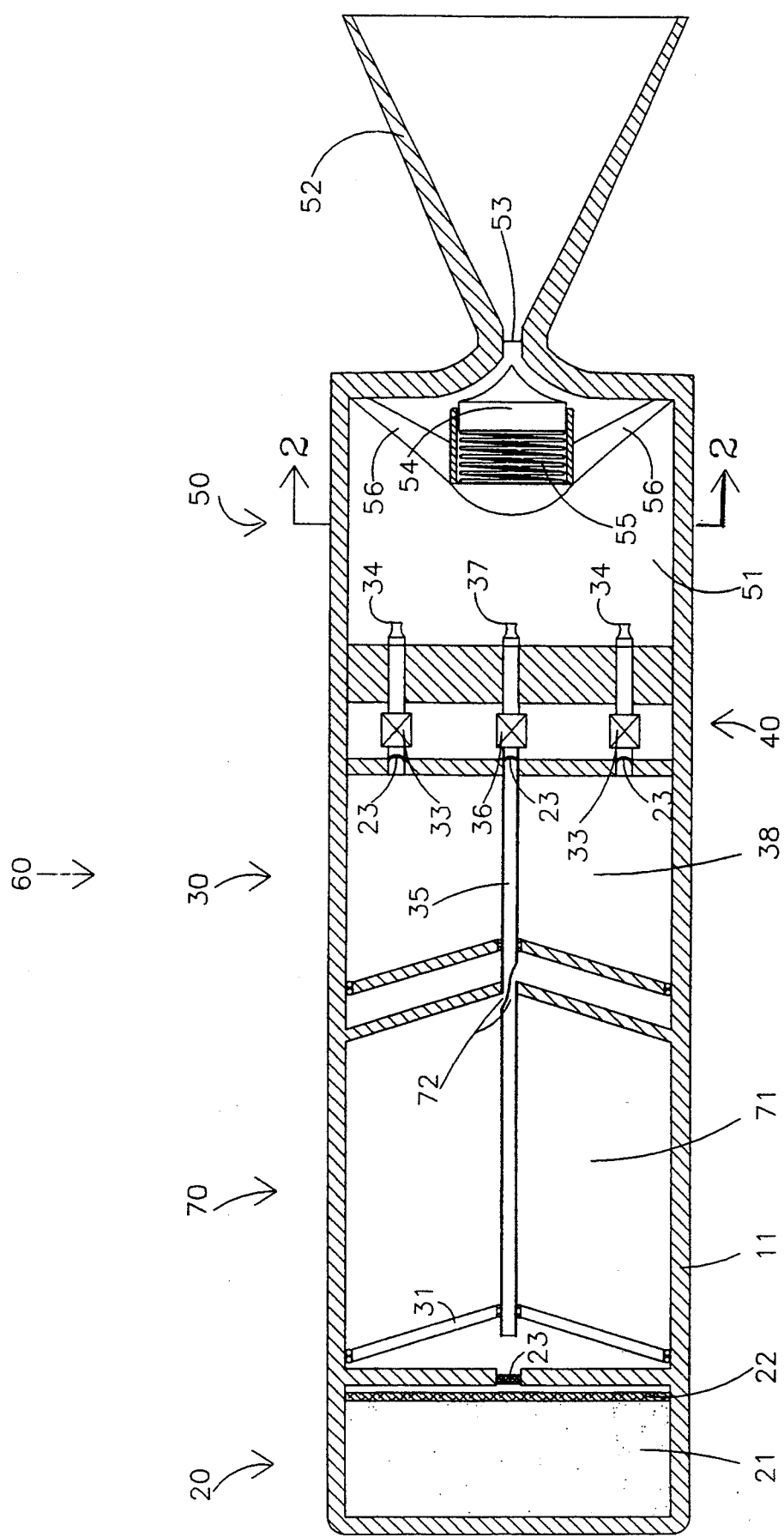
FIG. 3 depicts a pintle-controlled gel bipropulsion engine.

A pressure controlled pintle, under spring pressure or other constant pressure actuator means, functions in a pintle-controlled hybrid propellant engine as depicted in FIG. 1. FIG. 3 depicts an alternate combination wherein a pressure controlled pintle under spring pressure or other constant pressure actuator means function in a pintle-controlled gel bipropulsion engine.

In operation of the hybrid pintle-controlled engine, as the propellants are throttled through injectors for fuel-rich combustion effluent and through injectors for oxidizer gel and when combustion chamber pressure drops, the pintle spring or other constant pressure actuator means closes a gap between the pintle and nozzle of the engine of FIG. 1. In a similar fashion, as the propellants are throttled through injectors for oxidizer gel and fuel gel and when combustion chamber pressure drops, the pintle spring or other constant pressure actuator means closes a gap between the pintle and nozzle of the pintle-controlled gel bipropellant engine of FIG. 3. In each operation, by eliminating the drop of specific impulse (Isp) due to retaining pressure, the system cost is at a reasonable level since only a single engine is required for each system whose efficiency remains high over a wide thrust range. In either operation, the design of the constant pressure, variable thrust bipropellant engines achieves continuously variable thrust with minimal propellant efficiency losses and for a reasonable cost.

The broad description of the invention including workable combinations of the invention are set forth below prior to the detailed description of the preferred embodiments. This description can be related to FIGS. 1-4 of the Drawing to ascertain the orientation of the relationships of the working elements in combination.

A bipropellant injector injects fuel and oxidizer into the combustion chamber for hypergolic reaction. The injector can be any standard bipropellant injector including, a face shut-off, impinging stream, vortex, or any other standard design. Any fuel or oxidizer combination can be used including liquid, gel, or gaseous. Injector contains a throttling valve to control the flow rate of the propellants. The propellants react to produce pressure in the combustion chamber. When a spring is used as the constant pressure actuator means, the pressure in the combustion chamber forces the controlling pintle against the pintle, compressing the spring until the forces on the pintle are in equilibrium at the design combustion chamber pressure. Other constant pressure actuator means can be employed to move the pintle to maintain the system at the design pressure. The combustion products exit the combustion chamber through the nozzle throat, defined as the area between the pintle and nozzle and expands to atmospheric pressure thereby providing thrust.

In further reference to FIG. 1 of the drawing, a schematic view of a pintle-controlled hybrid engine (P-CHE) 10, which is housed in an engine case 11, further comprises in combination a fuel-source, e.g., a solid fuel gas generator (SFGG) system 20, an oxidizer storage and expulsion system 30, a system controller 40, and a pintle-controlled propulsion system 50. When the P-CHE 10 is started, the SFGG composition 21 is ignited by igniter means 22 which produces fuel-rich combustion effluent to pressurize and rupture a pressure disc 23 and to supply pressurization which is retained by seal means 32 for extrusion member 31 (e.g., piston or bladder means) to expel oxidizer gel 38 through throttling valves 33 and injectors 34 into combustion chamber 51. Simultaneously, the fuel-rich combustion effluent is expelled through conduit means 35 and through throttling valve 36 and injector 37 into the combustion chamber 51. Controlling devices, such as orifices or venturi tubes must be used to maintain the SFGG pressure higher than the oxidizer gel pressure which must be greater than the combustion chamber pressure. To be more specific, the pressure of the SFGG must be greater than the combustion chamber and also greater than the oxidizer gel tank pressure. Hypergolic reaction between fuel-rich combustion effluent and oxidizer gel takes place on contact in combustion chamber. Collectively, the flow of fuel-rich combustion effluent and oxidizer gel can be termed propellant flow.

Figure 2:
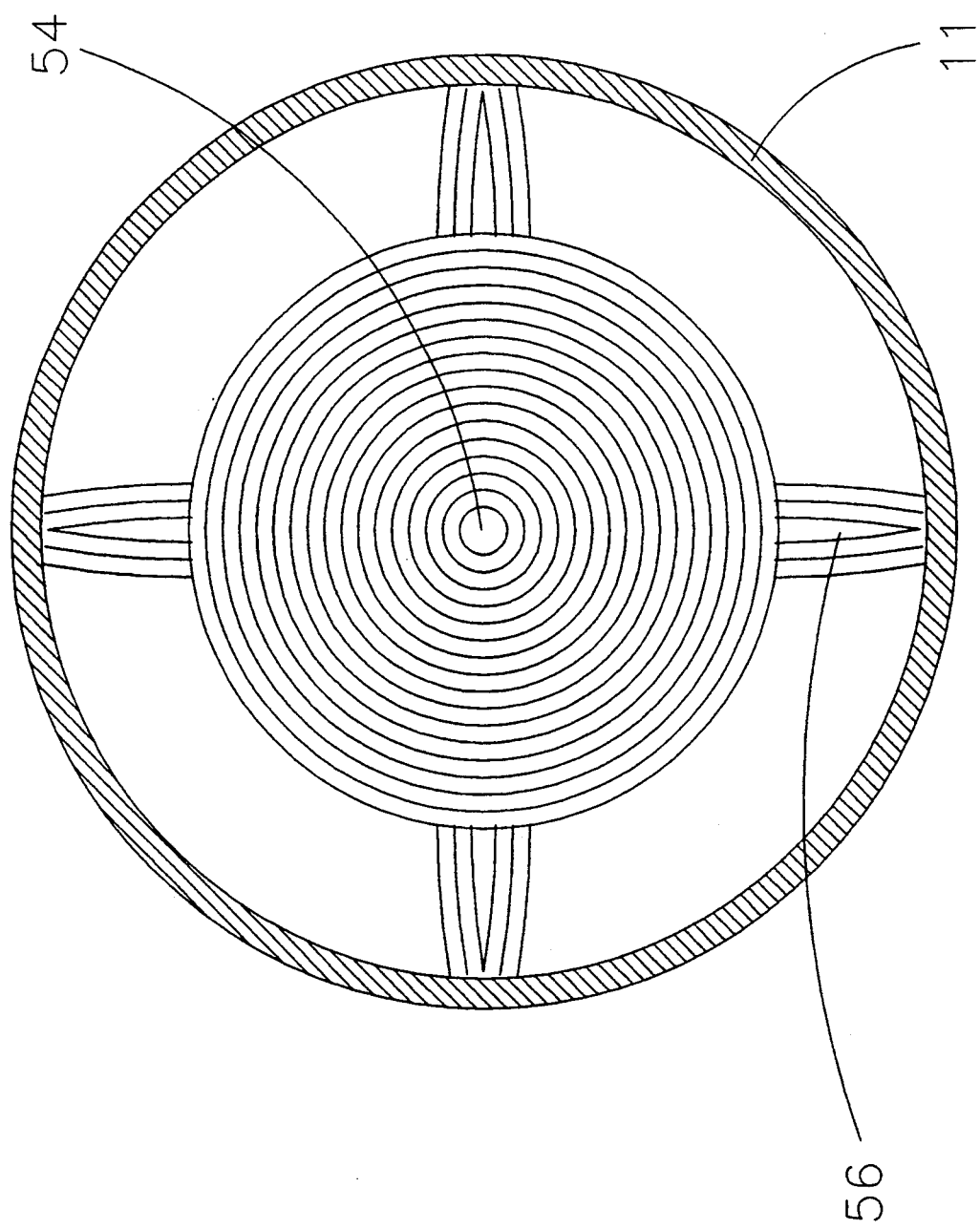
FIG. 2 depicts a sectional view taken along line 2—2 of FIG. 1.
Figure 4:
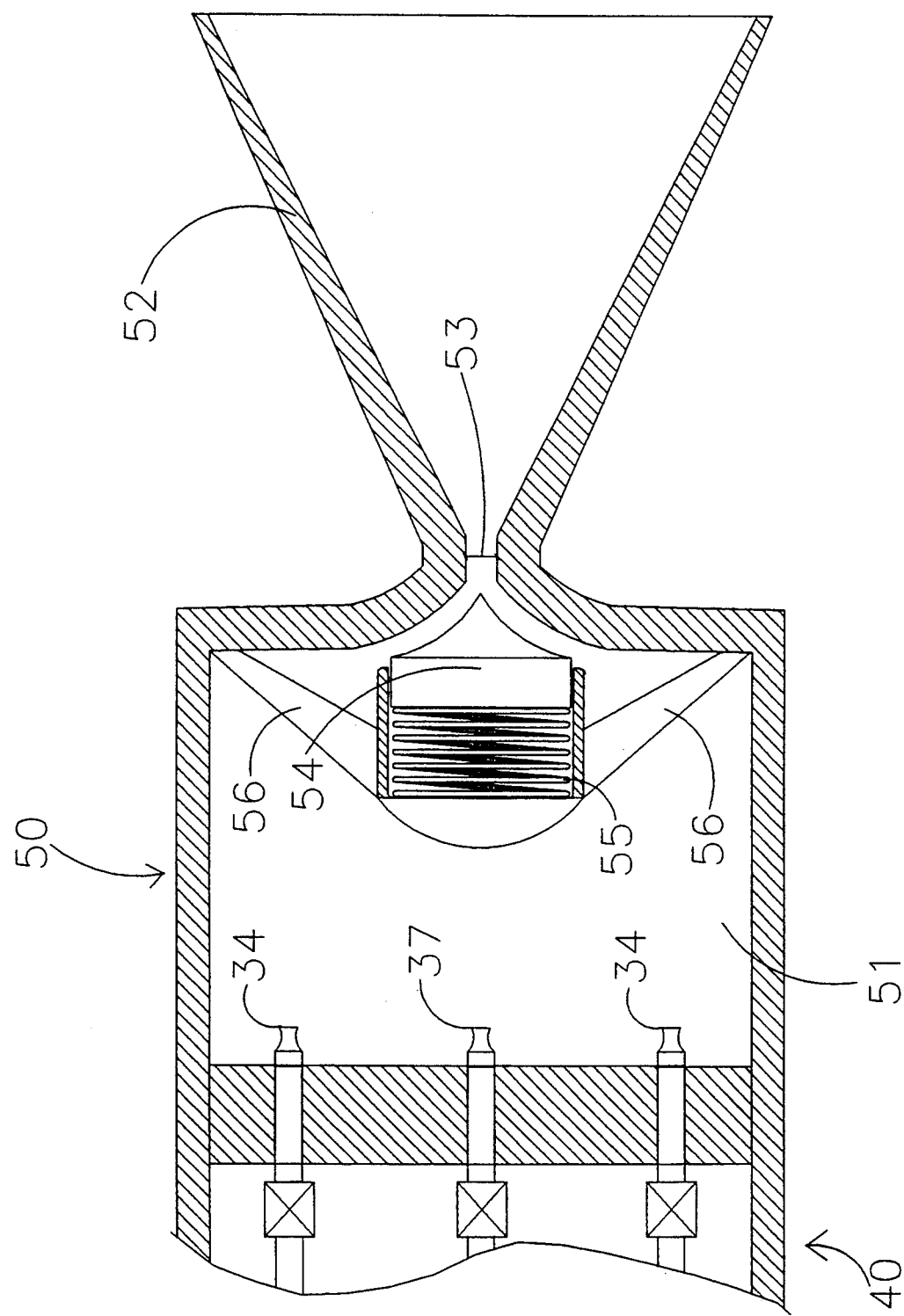
FIG. 4 depicts the constant pressure, variable thrust bipropellant engine shown in an enlarged view after being removed from associated elements of FIGS. 1 and 3 to depict better clarity of pressure controlling pintle.

The propulsion system 50, shown in an enlarged view in FIG. 4, comprises the combustion chamber 51, nozzle 52 and nozzle throat 53, and pressure controlling pintle 54 including support structures 56, and pintle spring 55 or other constant pressure actuator means to the controlling pintle to maintain the design combustion chamber pressure. The combustion products exit the combustion chamber through the nozzle throat 53 which is defined as the area between pressure controlling pintle 54 and nozzle 52. FIG. 2, a view along line 2—2 of FIG. 1 provides a better perspective of the pressure controlling pintle in place.

When lower thrust is desired for a spring constant pressure actuator, the throttling valve in injector 34 and injector 37 reduces the propellant flow rate, which causes a lower pressure in the combustion chamber 51. As the pressure becomes smaller, the spring 55 forces the pintle 54 toward the nozzle throat 53. This increases the pressure in the combustion chamber 51 until the force on the pintle due to pressure equals that from the spring, re-establishing the design pressure. For other actuators, a pressure sensor in the combustion chamber, the system controller and an actuator means such as electro-mechanical, hydraulic or pneumatic, are used to maintain design pressure. Because the combustion chamber pressure effectively remains constant, the propellant usage efficiency remains high, but the thrust level decreases because of the lower mass flow through the nozzle. The system controller 40 receives input from (either on board or remotely located output signals) for the throttling propellant flow rate as required to achieve desired operation.

When a higher thrust is desired for a spring constant pressure actuator, the throttling valve in injector 34 and 37 increases the propellant flow rate, which causes a higher pressure in the combustion chamber. The increased pressure pushes the pintle 54 against the spring 52, opening the nozzle throat 53, which reduces the pressure to the design point. For other actuators, a pressure sensor in the combustion chamber, the system controller and an actuator means such as electromechanical, hydraulic or pneumatic, are used to maintain design pressure. Because the pressure in the combustion chamber 51 remains the same, the Isp is not greatly changed, but the thrust level increases because of the increase in the mass flow through the nozzle.

Further reference is made to FIG. 3 of Drawing wherein like or related parts having similar functions as illustrated in FIG. 1 are assigned the same numeral notations. FIG. 3 depicts a pintle-controlled gel bipropulsion engine 60 which employs a fuel source storage and expulsion system 70, e.g., fuel gel, a gas generator system 20, an oxidizer storage and expulsion system 30, a system controller 40, and a pintle-controlled propulsion system 50. The pintle-controlled gel bipropulsion engine (P-CGBE) 60 employs a gas generator composition as a source after ignition to generate combustion products to pressurize and rupture pressure discs 23, extrude fuel gel 71 through exit ports 72 and subsequently through conduit means 35, throttling valve 36, and injector 37 into combustion chamber 51. Simultaneously, oxidizer gel 38 is extruded through throttling valves 33 and injectors 34 into combustion chamber 51 for hypergolic combustion with fuel gel 71.

The fuel gas generator system 20, as depicted in FIG. 1 of the drawings, comprises cured glycidyl azide polymer 21 (GAP fuel). GAP gas generator composition is prepared from a glycidyl azide polymer diol and/or triol polymerized with di- or tri- functional isocyanate such as isophorone diisocyanate or hexamethyl diisocyanate. No other components are required for the solid fuel gas generator, although other polymers, plasticizers, combustion modifiers, or fuel additives selected from carbon or aluminum may be added to give better physical or improved density or performance characteristics.

The glycidyl azide polymer (GAP) has a high pressure exponent that can be exploited to control the burning rate of GAP fuel through a variable flow injector for the solid fuel gas generator (SFGG). An ignitor system is not required in the combustion chambers because the SFGG combustion products or effluent undergo a hypergolic reaction with inhibited red fuming nitric acid gel (IRFNA GEL) which is stored in the oxidizer storage/extrusion system 30.

Other solid fuel gas generator compositions are applicable if they combust to produce combustible fuel gases and have a moderate to high pressure exponent.

A gas generator composition, depicted in FIG. 3 of drawings, functions to provide pressurization for extrusion of fuel gel and oxidizer gel for hypergolic reaction in combustion chamber. The pressurization gases can be consumed in combustion chamber following expulsion of fuel gel through conduit 35, throttling valve 36, and injector 37. The gas generator shown is a monolithic solid grain, however, multiple solid grain or wafer, liquid or gel monopropellant, and liquid or gel bipropellant gas generators are also applicable.

The system controller 40 receives input from either on-board or remotely located output signals for reducing or increasing propellant flow to achieve desired operation in combination with pressure controlling pintle to achieve constant pressure but variable thrust due to changing of propellant mass flow through nozzle. A system controller is disclosed in commonly assigned U.S. Pat. No. 5,133,183 issued on Jul. 28, 1992 to Asaoka et al. The teachings of this system controller function is incorporated hereinbelow for a better understanding of the role and function that the present system controller plays in combination with the pressure controlling pintle of the present invention.

As employed in the gel/solid bipropellant propulsion system of U.S. Pat. No. 5,133,183, the system controller receives input signal through signal transmission lines for fuel-rich combustion effluent supply/flow line pressure gauge and oxidizer gel supply/flow line pressure gauge, respectively. The system controller sends output signals to control means for opening and closing blowdown shutoff valve for reducing pressure in the solid fuel gas generator vessel to extinguish combustions of solid fuel gas generator composition. The system controller also sends output signals to control means for opening and closing valves, respectively. These valves are for fuel-rich combustion effluent line, oxidizer gel line, shut-off valve in oxidizer gel pressurization line, and reignition shut-off valve in oxidizer gel line, respectively. The system controller controls the throttling controllers for fuel-rich combustion effluent metering valve and oxidizer gel metering valve. The system controller receives input signal through signal transmission line form combustion chamber pressure gauge and data sensor for controlling combustion hypergolic reaction between the fuel-rich combustion effluent and oxidizer gel in the combustion zone of the engine.

Thus, the system controller requires a power or energy source which may be optional; however, the power supply or energy source, must be compatible with the control means employed to achieve a desired response time. For example, a control means which is a solenoid system has a longer response time for opening and closing valves and would require an electrical energy source. A hydraulic or pneumatic energy source, which yields a shorter response time, such as for use in fluidic control, requires hydraulic fluid or gas media and related functional elements. The system controller can be made operable or activated by remote means included within design parameters of a selected guidance and control system employed such as infrared, electronic beam or electromagnetic wave systems including radar, radio, and television. Thus, the system controller can be linked to a ground guidance and control (G&C) system through signal processors or to a G&C system of the parent vehicle from which the gel/solid bipropellant propulsion system is ejected or launched, or to aircraft G&C system exercising control, or to on board sensors which can achieve operational compatibility with a combination of G&C systems for activating the system controller which performs the required functions needed in controlling the gel/solid bipropellant propulsion system with energy management capability.

The above description centers around a system controller for total energy management function, whereas the system controller of the present invention centers around re-establishing the design pressure until the pressure in the combustion chamber 51 equals the force on the pintle from the spring 55. When a higher thrust is desired, the system controller 40 controls the throttling valve 34 to increase the propellant flow rate, which causes a higher pressure in the combustion chamber. For a spring constant pressure actuator, the increased pressure results in pushing the pintle 54 against spring 54, thus increasing the opening of the nozzle throat 53 which reduces the pressure to re-establish the desired pressure point or design pressure.

Thus, the system controller as specified for use with this invention operates the valves and sets flow rates in response to system guidance and control instructions. The power supply, sensors, and control means which functions with the system/controller include those elements for power supply, sensors, and control means which may be selected from well known prior art sources for functional compatibility with the system controller and its functions performed in the pintle-controlled gel bipropulsion engine.

Although a particular embodiment, which employs a spring constant pressure actuator to open or close the gap between the pintle and nozzle to re-establish the desired pressure point or design pressure of the engine, has been shown and described in FIGS. 1-4, it is apparent that various modifications of the invention may be made by those skilled in the art without departing from the spirit and scope of the foregoing disclosure. For examples, the constant pressure actuator means can be controlled electromechanically, hydraulically, or pneumatically to open or close the gap between the pintle and nozzle to re-establish the desired pressure point or design pressure of the engine. Therefore, the scope of the invention should be limited only by the claims appended hereto.

We claim:

1. A constant pressure, variable thrust, pressure controlled pintle propellant engine comprising in combination:
   (i) a case having a forward end and an aft end for containing said constant pressure, variable thrust, pressure controlled pintle propellant engine and its components;
   (ii) an oxidizer storage and oxidizer expulsion system containing a gelled oxidizer within said case, said oxidizer expulsion system effecting injection of said oxidizer into a combustion chamber for hypergolic reaction with a fuel-source, simultaneously injected into said combustion chamber;
   (iii) a fuel source storage and a fuel-source expulsion system containing a fuel-source within said case,- said fuel-source and fuel-source expulsion system comprising a solid fuel gas generator which after being ignited produces fuel-rich combustion effluent which functions as a fuel-source which is injected into said combustion chamber for hypergolic combustion with a simultaneously injected oxidizer, said fuel-rich combustion effluent also functioning as a pressurization means for said oxidizer expulsion system to effect simultaneous injection of said gelled oxidizer into said combustion chamber to achieve said hypergolic reaction;
   (iv) an oxidizer injector mounted within said case, said oxidizer injector containing a throttling valve to control the flow rate of said oxidizer injected into a combustion chamber;
   (v) a fuel-source injector mounted within said case, said fuel-source injector containing a throttling valve to control the flow rate of said fuel-source into a combustion chamber;
   (vi) a system controller mounted within said case for controlling operation of said oxidizer and fuel source throttling valves and the resulting flow rates of said oxidizer and fuel source into a combustion chamber;
   (vii) a combustion chamber defined within said case for receiving said oxidizer and said fuel-source for hypergolic reaction to yield combustion products for discharging through an exhaust nozzle including a throat area whose effective throat area is changed by movement of a pintle controlled by a constant pressure actuator;
   (viii) a pressure controlled pintle mounted in said combustion chamber, said pressure controlled pintle provided with a constant pressure actuator which is activated by combustion chamber forces exerted upon said pressure controlled pintle by said hypergolic reaction, said constant pressure actuator effective in changing the effective throat area which is defined as the area between said pintle and an exhaust nozzle mounted at the aft end of said constant pressure, variable thrust pressure controlled pintle propellant engine, said changing of effective throat area effective in establishing an equilibrium at the design combustion chamber pressure which is maintained at constant chamber pressure while achieving a variable specific impulse and thrust resulting from an increase or decrease in the discharging of combustion products through said exhaust nozzle; and
   (ix) an exhaust nozzle having a constant throat area mounted at aft end of said constant pressure, variable thrust, pressure controlled pintle propellant engine for discharging said combustion products to provide thrust, said constant throat area being changed to said effective throat area which established said equilibrium at the design combustion chamber pressure which is maintained at constant chamber pressure while achieving a variable thrust resulting from an increase or decrease in the discharging of said combustion products through said throat area and said exhaust nozzle.

2. The constant pressure, variable thrust, pressure controlled pintle propellant engine as defined in claim 1 wherein said gelled oxidizer is inhibited red fuming nitric acid and wherein said solid fuel gas generator is prepared from a glycidyl azide polymer diol and/or triol polymerized with di- or trifunctional isocyanate and containing optional additions of solid fuels selected from carbon or aluminum, optional plasticizers, and/or optional combustion modifiers.

3. A constant pressure, variable thrust, pressure controlled pintle bipropellant engine comprising in combination:
   (i) a case having a forward end and an aft end for containing said constant pressure, variable thrust, pressure controlled pintle propellant engine and its components;
   (ii) an oxidizer storage and oxidizer expulsion system containing a gelled oxidizer within said case, said oxidizer expulsion system effecting injection of said oxidizer into a combustion chamber for hypergolic reaction with a fuel-source, simultaneously injected into said combustion chamber;
   (iii) a fuel-source comprising a first and second storage and a first and second fuel-source expulsion system containing a first fuel-source and a second fuel-source within said case, said first fuel-source and said first fuel-source expulsion system comprising a solid fuel gas generator which after being ignited produces fuel-rich combustion effluent which functions as a pressurization means for said oxidizer expulsion system to effect injection of gelled oxidizer into said combustion chamber, said fuel-rich combustion effluent also functioning as a pressurization means for said second fuel-source expulsion system to effect simultaneous injection of said second fuel-source into said combustion chamber to achieve said hypergolic reaction with said simultaneously injected gelled oxidizer;

(iv) an oxidizer injector mounted within said case, said oxidizer injector containing a throttling valve to control the flow rate of said oxidizer injected into a combustion chamber;

(v) a fuel-source injector mounted within said case, said fuel-source injector containing a throttling valve to control the flow rate of said fuel-source into a combustion chamber;

(vi) a system controller mounted within said case for controlling operation of said oxidizer and fuel source throttling valves and the resulting flow rates of said oxidizer and said fuel source into a combustion chamber;

(vii) a fuel-source comprising a combustion chamber defined within said case for receiving said oxidizer and said fuel-source for hypergolic reaction to yield combustion products for discharging through an exhaust nozzle including a throat area whose effective throat area is changed by movement of a pintle controlled by a constant pressure actuator;

(viii) a pressure controlled pintle mounted in said combustion chamber, said pressure controlled pintle provided with a constant pressure actuator which is activated by combustion chamber forces exerted upon said pressure controlled pintle by said hypergolic reaction, said constant pressure actuator effective in changing the effective throat area which is defined as the area between said pintle and an exhaust nozzle mounted at the aft end of said constant pressure, variable thrust, pressure controlled pintle propellant engine, said changing of effective throat area effective in establishing an equilibrium at the design combustion chamber pressure which is maintained at constant chamber pressure achieving a variable specific impulse and thrust resulting from an increase or decrease in the discharging of combustion products through said exhaust nozzle; and (ix) an exhaust nozzle having a constant throat area mounted at aft end of said constant pressure, variable thrust, pressure controlled pintle propellant engine for discharging said combustion products to provide thrust, said constant throat area being changed to said effective throat area which established said equilibrium at the design combustion chamber pressure which is maintained at constant chamber pressure while achieving a variable thrust resulting from an increase or decrease in the discharging of said combustion products through said throat area and said exhaust nozzle.

4. The constant pressure, variable thrust, pressure controlled pintle bipropellant engine as defined in claim 3 wherein said gelled oxidizer is inhibited red fuming nitric acid and wherein said solid fuel gas generator is prepared from a glycidyl azide polymer diol and/or triol polymerized with di- or trifunctional isocyanate and containing optional additions of solid fuels selected from carbon or aluminum, optional plasticizers, and/or optional combustion modifiers, and wherein said second fuel source is a fuel gel.

* * * * *